US011538037B2

(12) United States Patent
Hart et al.

(10) Patent No.: US 11,538,037 B2
(45) Date of Patent: *Dec. 27, 2022

(54) UPDATING A MACHINE LEARNING FRAUD MODEL BASED ON THIRD PARTY TRANSACTION INFORMATION

(71) Applicant: Capital One Services, LLC, McLean, VA (US)

(72) Inventors: Colin Hart, McLean, VA (US); Joshua Edwards, McLean, VA (US); Francisco Perezleon, McLean, VA (US); Molly Johnson, McLean, VA (US); Kaitlin Newman, McLean, VA (US); Angelina Wu, McLean, VA (US); Jason Ji, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 405 days.

This patent is subject to a terminal disclaimer.

(21) Appl. No.: 15/929,921

(22) Filed: May 29, 2020

(65) Prior Publication Data

US 2020/0294054 A1 Sep. 17, 2020

Related U.S. Application Data

(63) Continuation of application No. 16/279,723, filed on Feb. 19, 2019, now Pat. No. 10,672,005.

(51) Int. Cl.
*G06Q 20/40* (2012.01)
*G06N 20/00* (2019.01)

(52) U.S. Cl.
CPC ......... *G06Q 20/4016* (2013.01); *G06N 20/00* (2019.01)

(58) Field of Classification Search
CPC ... G06Q 20/4016; G06N 20/00; H04W 12/12; H04W 12/128
See application file for complete search history.

(56) References Cited

U.S. PATENT DOCUMENTS

| 7,263,506 B2 | 8/2007 | Lee et al. |
| 10,672,005 B1 * | 6/2020 | Hart ....................... G06N 20/00 |

(Continued)

OTHER PUBLICATIONS

Kalaiselvi N. et al, Credit Card Fraud Detection Using Learning to Rank Approach, IEEE (Year: 2018).*

*Primary Examiner* — Shanto Abedin
(74) *Attorney, Agent, or Firm* — Harrity & Harrity, LLP

(57) ABSTRACT

A device receives first transaction information associated with a first transaction, and a first transaction account utilized for the first transaction and associated with a first financial institution. The device determines, based on a fraud model, that the first transaction is to be denied due to potential fraud associated with the first transaction account and receives second transaction information associated with a second transaction, and a second transaction account utilized for the second transaction and associated with a second financial institution. The device processes the first transaction information and the second transaction information, with a matching model, to determine whether the first transaction information matches the second transaction information and determines that the first transaction was incorrectly denied when the first transaction information matches the second transaction information within a predetermined threshold. The device performs one or more actions based on determining that the first transaction was incorrectly denied.

20 Claims, 12 Drawing Sheets

(56) References Cited

U.S. PATENT DOCUMENTS

| | | | |
|---|---|---|---|
| 11,348,110 B2* | 5/2022 | Adjaoute | G06Q 10/0635 |
| 11,379,855 B1* | 7/2022 | Anderson | G06Q 30/0185 |
| 2002/0133721 A1* | 9/2002 | Adjaoute | H04L 63/0407 |
| | | | 726/23 |
| 2006/0161435 A1 | 7/2006 | Atef et al. | |
| 2012/0203698 A1* | 8/2012 | Duncan | G06Q 20/34 |
| | | | 705/44 |
| 2015/0142595 A1 | 5/2015 | Acuna-Rohter | |
| 2017/0178135 A1 | 6/2017 | Bull et al. | |
| 2018/0053114 A1* | 2/2018 | Adjaoute | G06Q 20/4016 |
| 2019/0066112 A1* | 2/2019 | Adjaoute | G06Q 40/025 |
| 2019/0385170 A1* | 12/2019 | Arrabothu | G06N 7/005 |

* cited by examiner

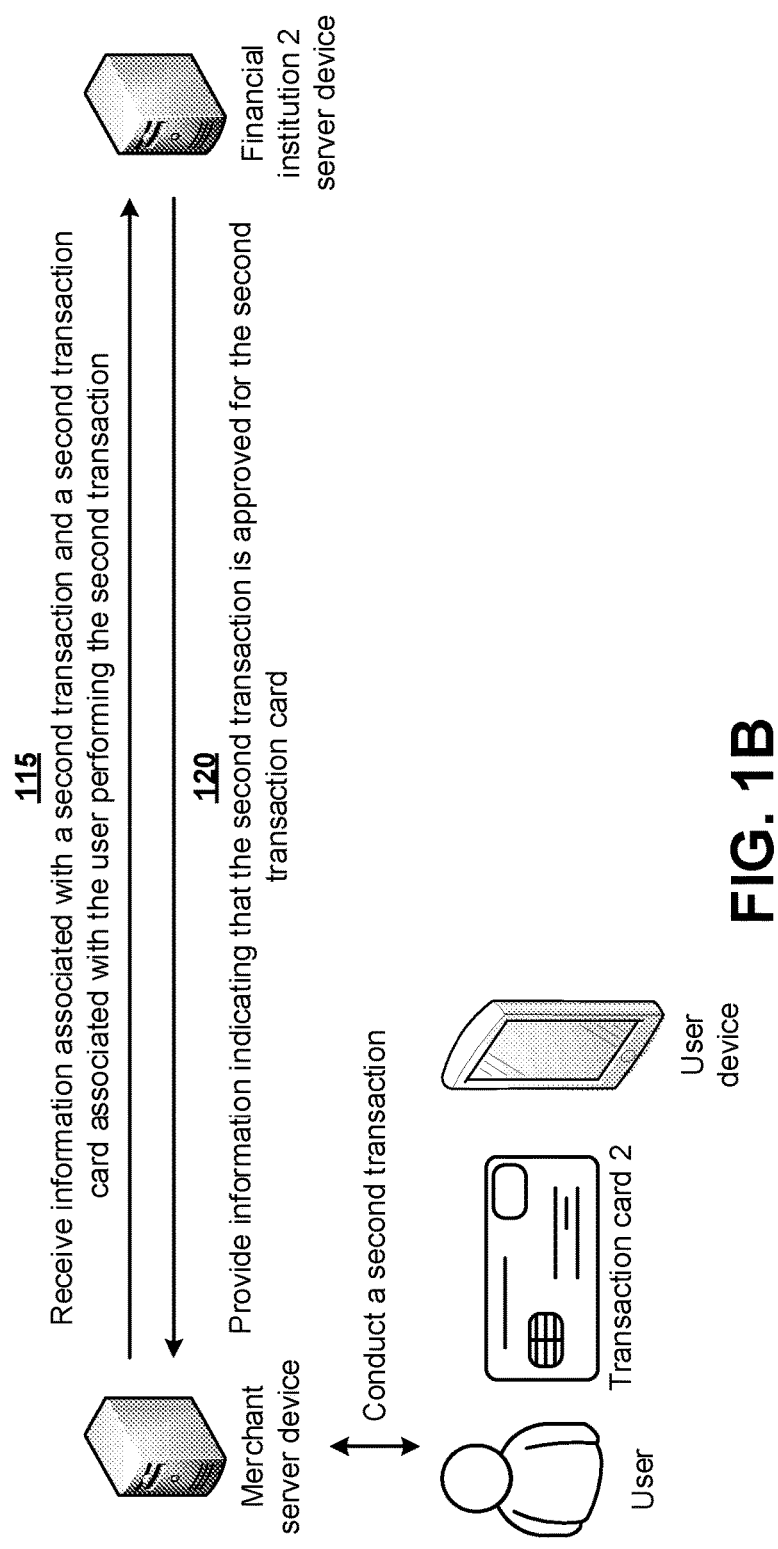

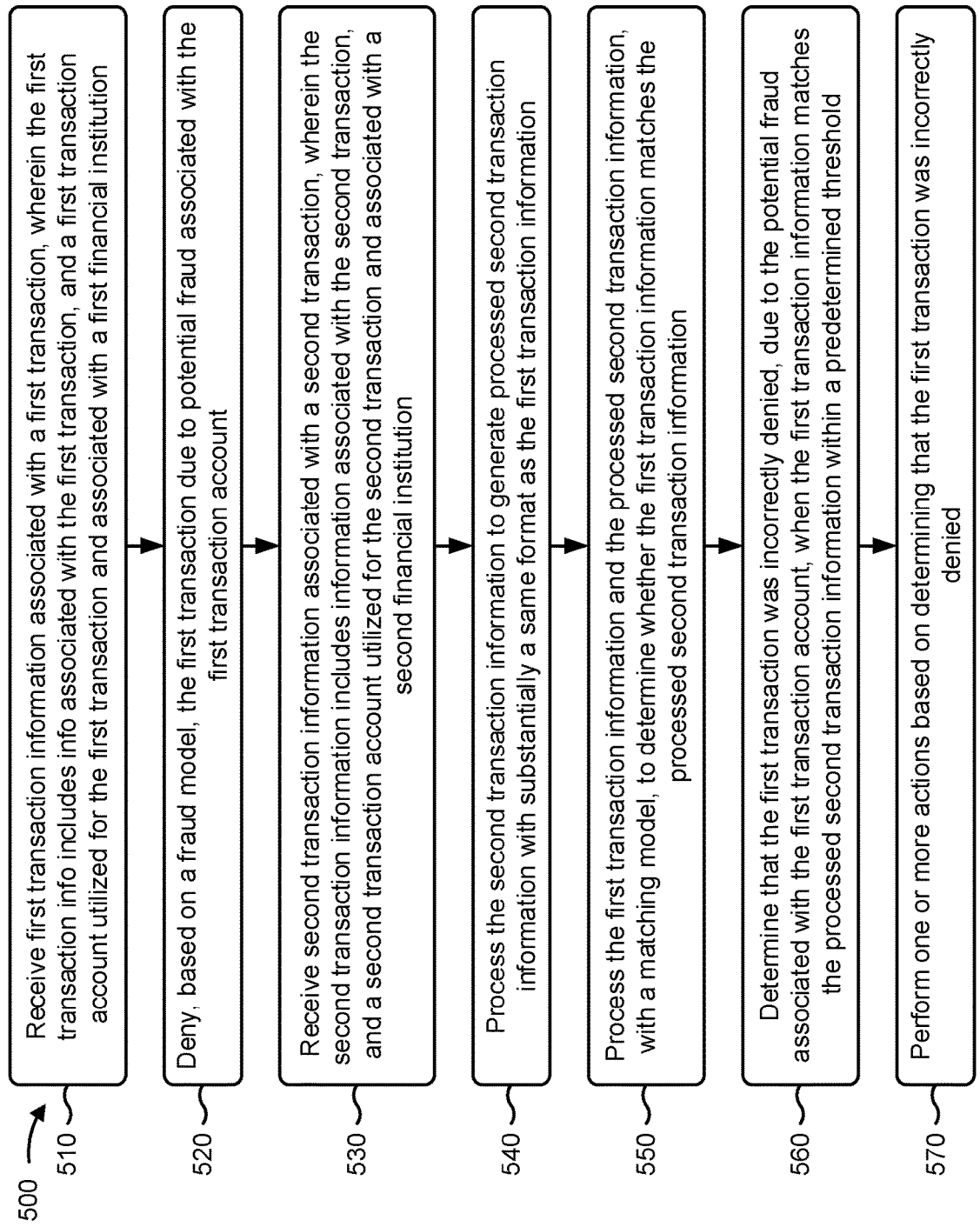

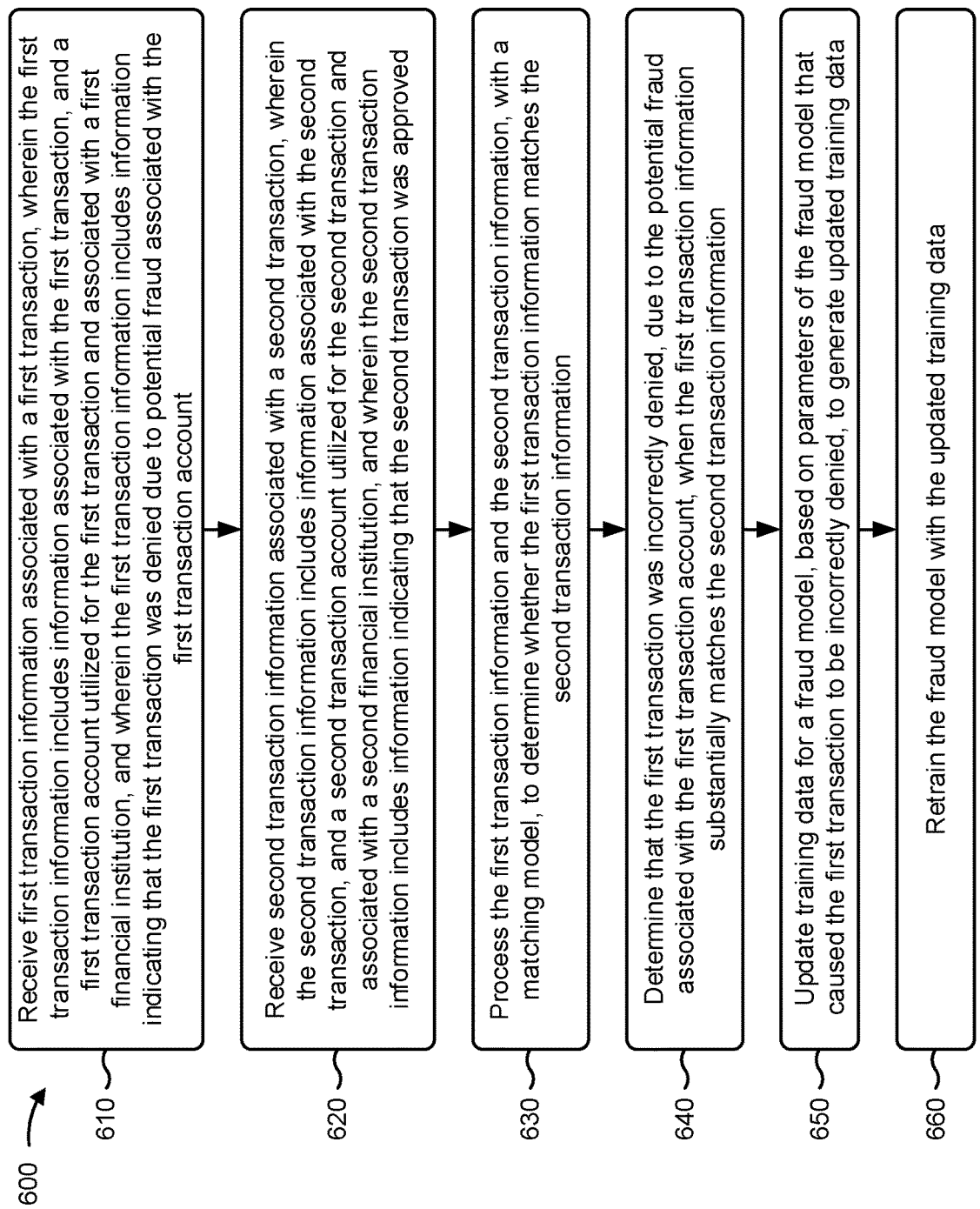

US 11,538,037 B2

UPDATING A MACHINE LEARNING FRAUD MODEL BASED ON THIRD PARTY TRANSACTION INFORMATION

RELATED APPLICATION

This application is a continuation of U.S. patent application Ser. No. 16/279,723, filed Feb. 19, 2019 (now U.S. Pat. No. 10,672,005), which is incorporated herein by reference.

BACKGROUND

A user utilizes a transaction card to perform in-person transactions (e.g., purchase goods and/or services at a merchant's store), to perform online transactions (e.g., paying a bill, purchasing goods and/or services, etc.), and/or the like. When performing a transaction with a transaction card, a merchant device may request approval of utilization of the transaction card from a financial institution that issued the transaction card.

SUMMARY

According to some implementations, a method may include receiving first transaction information associated with a first transaction, wherein the first transaction information may include information associated with the first transaction, and a first transaction account utilized for the first transaction and associated with a first financial institution. The method may include determining, based on a fraud model, that the first transaction is to be denied due to potential fraud associated with the first transaction account and receiving second transaction information associated with a second transaction, wherein the second transaction information may include information associated with the second transaction, and a second transaction account utilized for the second transaction and associated with a second financial institution. The method may include processing the first transaction information and the second transaction information, with a matching model, to determine whether the first transaction information matches the second transaction information and determining that the first transaction was incorrectly denied, due to the potential fraud associated with the first transaction account, when the first transaction information matches the second transaction information within a predetermined threshold. The method may include performing one or more actions based on determining that the first transaction was incorrectly denied.

According to some implementations, a device may include one or more memories and one or more processors, communicatively coupled to the one or more memories, configured to receive first transaction information associated with a first transaction, wherein the first transaction information may include information associated with the first transaction, and a first transaction account utilized for the first transaction and associated with a first financial institution. The one or more processors may deny, based on a fraud model, the first transaction due to potential fraud associated with the first transaction account and may receive second transaction information associated with a second transaction, wherein the second transaction information may include information associated with the second transaction, and a second transaction account utilized for the second transaction and associated with a second financial institution. The one or more processors may process the second transaction information to generate processed second transaction information with substantially a same format as the first transaction information and may process the first transaction information and the processed second transaction information, with a matching model, to determine whether the first transaction information matches the processed second transaction information. The one or more processors may determine that the first transaction was incorrectly denied, due to the potential fraud associated with the first transaction account, when the first transaction information matches the processed second transaction information within a predetermined threshold and may perform one or more actions based on determining that the first transaction was incorrectly denied.

According to some implementations, a non-transitory computer-readable medium may store instructions that include one or more instructions that, when executed by one or more processors of a device, cause the one or more processors to receive first transaction information associated with a first transaction, wherein the first transaction information may include information associated with the first transaction, and a first transaction account utilized for the first transaction and associated with a first financial institution, and wherein the first transaction information may include information indicating that the first transaction was denied due to potential fraud associated with the first transaction account. The one or more instructions may cause the one or more processors to receive second transaction information associated with a second transaction, wherein the second transaction information may include information associated with the second transaction, and a second transaction account utilized for the second transaction and associated with a second financial institution, and wherein the second transaction information may include information indicating that the second transaction was approved. The one or more instructions may cause the one or more processors to process the first transaction information and the second transaction information, with a matching model, to determine whether the first transaction information matches the second transaction information and determine that the first transaction was incorrectly denied, due to the potential fraud associated with the first transaction account, when the first transaction information substantially matches the second transaction information. The one or more instructions may cause the one or more processors to update training data for a fraud model, based on parameters of the fraud model that caused the first transaction to be incorrectly denied, to generate updated training data and retrain the fraud model with the updated training data.

BRIEF DESCRIPTION OF THE DRAWINGS

FIGS. 1A-1G are diagrams of an example implementation described herein.

FIGS. 4-6 are flow charts of example processes for updating a machine learning fraud model based on third party transaction information.

DETAILED DESCRIPTION

Figure 1A:
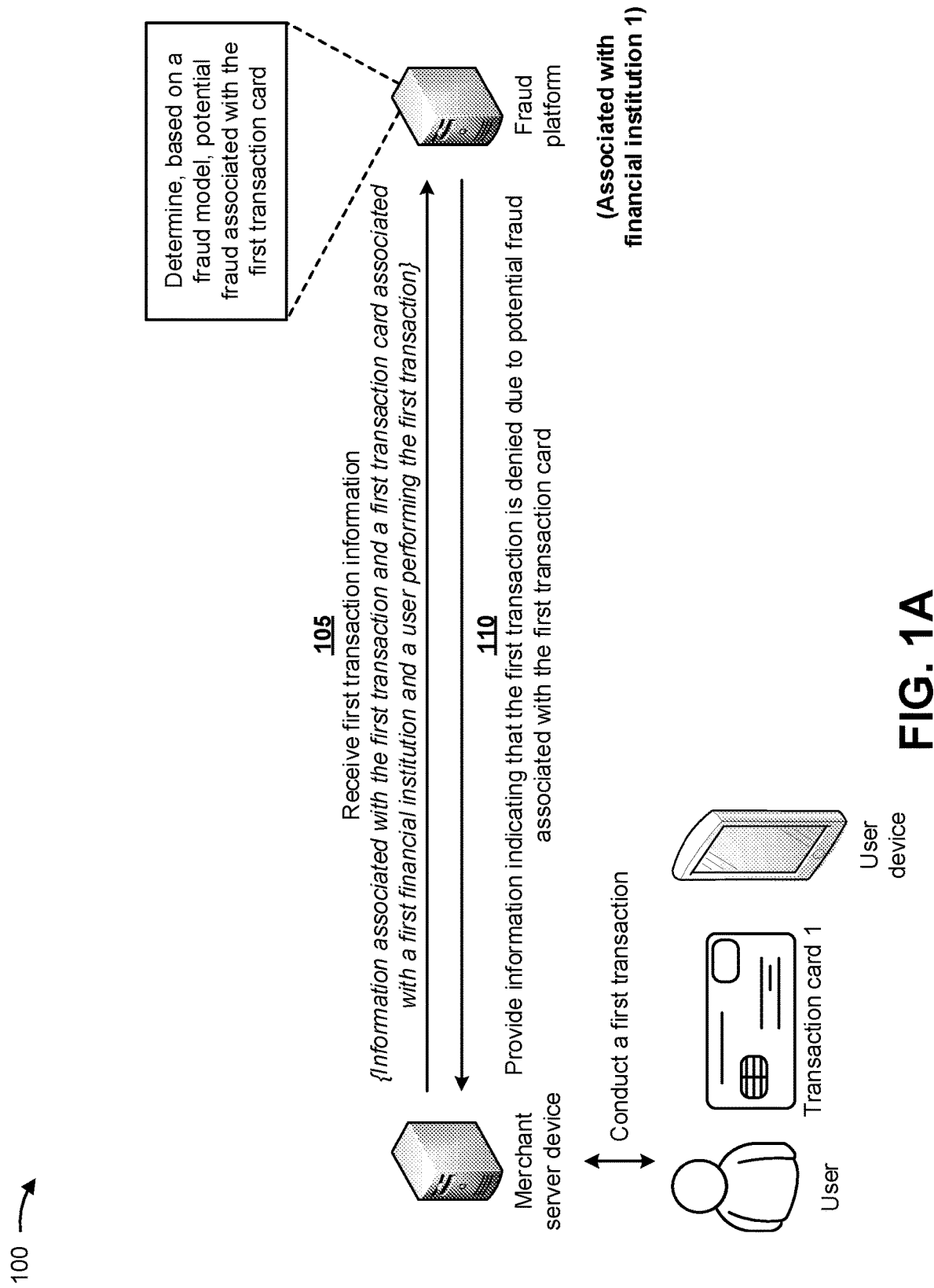

The following detailed description of example implementations refers to the accompanying drawings. The same reference numbers in different drawings may identify the same or similar elements.

When a device associated with a financial institution receives a request to utilize a transaction card (e.g., a credit card, a debit card, a rewards card, and/or the like), issued by the financial institution, for a transaction, the device may process the request with a fraud model (i.e., a fraud detection model) before approving the transaction. If the fraud model indicates that the transaction should be denied, the device associated with the financial institution will deny the transaction and notify a merchant device about the denial. In many instances, a user of the transaction card will utilize another transaction card (e.g., issued by another financial institution) to complete the transaction. If the other financial institution approves the transaction, the user may become upset and may cancel the transaction card with the financial institution, or may begin to use the other transaction card instead of the transaction card. Furthermore, the approval of the transaction by the other financial institution provides an indication of a potential technical problem with the fraud model utilized by the financial institution.

Some implementations described herein provide a fraud platform (i.e., a fraud detection platform) that updates a machine learning fraud model based on third party transaction information. For example, the fraud platform may receive first transaction information associated with a first transaction, and a first transaction card utilized for the first transaction and associated with a first financial institution. The fraud platform may determine, based on a fraud model, that the first transaction is to be denied due to potential fraud associated with the first transaction card, and may receive second transaction information associated with a second transaction and a second transaction card utilized for the second transaction and associated with a second financial institution. The fraud platform may process the first transaction information and the second transaction information, with a matching model, to determine whether the first transaction information matches the second transaction information and may determine that the first transaction was incorrectly denied, if the first transaction information matches the second transaction information within a predetermined threshold. The fraud platform may perform one or more actions based on determining that the first transaction was incorrectly denied.

While implementations have been described in connection with transaction cards by way of example, implementations described herein may be utilized with transaction accounts (e.g., a credit card account, a savings account, a checking account, a debit card account, a rewards card account, and/or the like) that is associated with a payment application executing on a user device.

In this way, the fraud platform quickly recognizes an incorrectly denied transaction and may attempt to compensate a customer associated with the incorrectly denied transaction for the inconvenience. Therefore, the fraud platform attempts to prevent losing the customer due to the denied transaction and improves customer service. The fraud platform also updates training data associated with the fraud model, based on the incorrectly denied transaction, so that the fraud model does not deny similar transactions in the future. This conserves resources (e.g., processing resources, memory resources, and/or the like) that would otherwise be wasted in attempting to retain customers inconvenienced by a faulty fraud model.

FIGS. 1A-1G are diagrams of an example implementation 100 described herein. As shown in FIG. 1A, a user device may be associated with a user (e.g., a customer), a first transaction card (e.g., transaction card 1), a merchant server device, and a fraud platform. The user of the user device may utilize the user device and/or the first transaction card to conduct a first transaction with the merchant server device. For example, a transaction account associated with the first transaction card may be associated with in a payment application executing on the user device, and the user may utilize the transaction account in the payment application to purchase a good and/or a service offered by a merchant associated with the merchant server device.

As further shown in FIG. 1A, and by reference number 105, the fraud platform may receive first transaction information from the merchant server device based on the user device utilizing the first transaction card to conduct the first transaction. In some implementations, the first transaction information may include information associated with the first transaction, the first transaction card, a first financial institution (e.g., financial institution 1) associated with the first transaction card and/or the user, the user performing the first transaction, the merchant associated with the merchant server device, and/or the like. In some implementations, the fraud platform may be associated with the first financial institution associated with the first transaction card and/or the user.

As further shown in FIG. 1A, the fraud platform may determine, based on a fraud model (e.g., a machine learning model), potential fraud associated with the first transaction card. In some implementations, the fraud platform may utilize the fraud model to determine whether to approve or deny transactions associated with transaction cards. For example, if the fraud model detects potential fraud associated with the first transaction card, the fraud platform may deny the first transaction. If the fraud model fails to detect potential fraud associated with the first transaction card, the fraud platform may approve the first transaction. In the example shown in FIG. 1A, since the fraud model detects potential fraud associated with the first transaction card, the fraud platform may deny the first transaction. In some implementations, the fraud platform may be part of or in communication with an authorization platform that approves and/or denies transactions.

As further shown in FIG. 1A, and by reference number 110, the fraud platform may provide, to the merchant server device, information indicating that the first transaction is denied due to potential fraud associated with the first transaction card. In some implementations, the merchant server device may provide, for display to the merchant, the information indicating that the first transaction is denied for the first transaction card. In such implementations, the merchant may inform the user that the first transaction card was not approved for the first transaction.

As shown in FIG. 1B, in some implementations, the user may attempt a second transaction (e.g., another attempt at the first transaction) with a second transaction card associated with a second financial institution (e.g., financial institution 2) that is different than the first financial institution. The user of the user device may utilize the user device and/or the second transaction card to conduct the second transaction with the merchant server device. For example, a second transaction account may be associated with the payment application executing on the user device, and the user may utilize the second transaction account in the payment application to purchase the good and/or the service offered by the merchant.

As further shown in FIG. 1B, and by reference number 115, a server device associated with the second financial institution may receive information associated with the second transaction, the second transaction card, the second financial institution associated with the second transaction card and/or the user, the user performing the second transaction, the merchant associated with the merchant server device, and/or the like. In some implementations, the server device associated with the second financial institution may approve the second transaction based on failing to detect potential fraud associated with the second transaction card.

As further shown in FIG. 1B, and by reference number 120, the server device associated with the second financial institution may provide, to the merchant server device, information indicating that the second transaction is approved for the second transaction card. In some implementations, the merchant server device may provide, for display to the merchant, the information indicating that the second transaction is approved for the second transaction card. In such implementations, the merchant may inform the user that the second transaction card was approved for the second transaction.

Figure 1C:
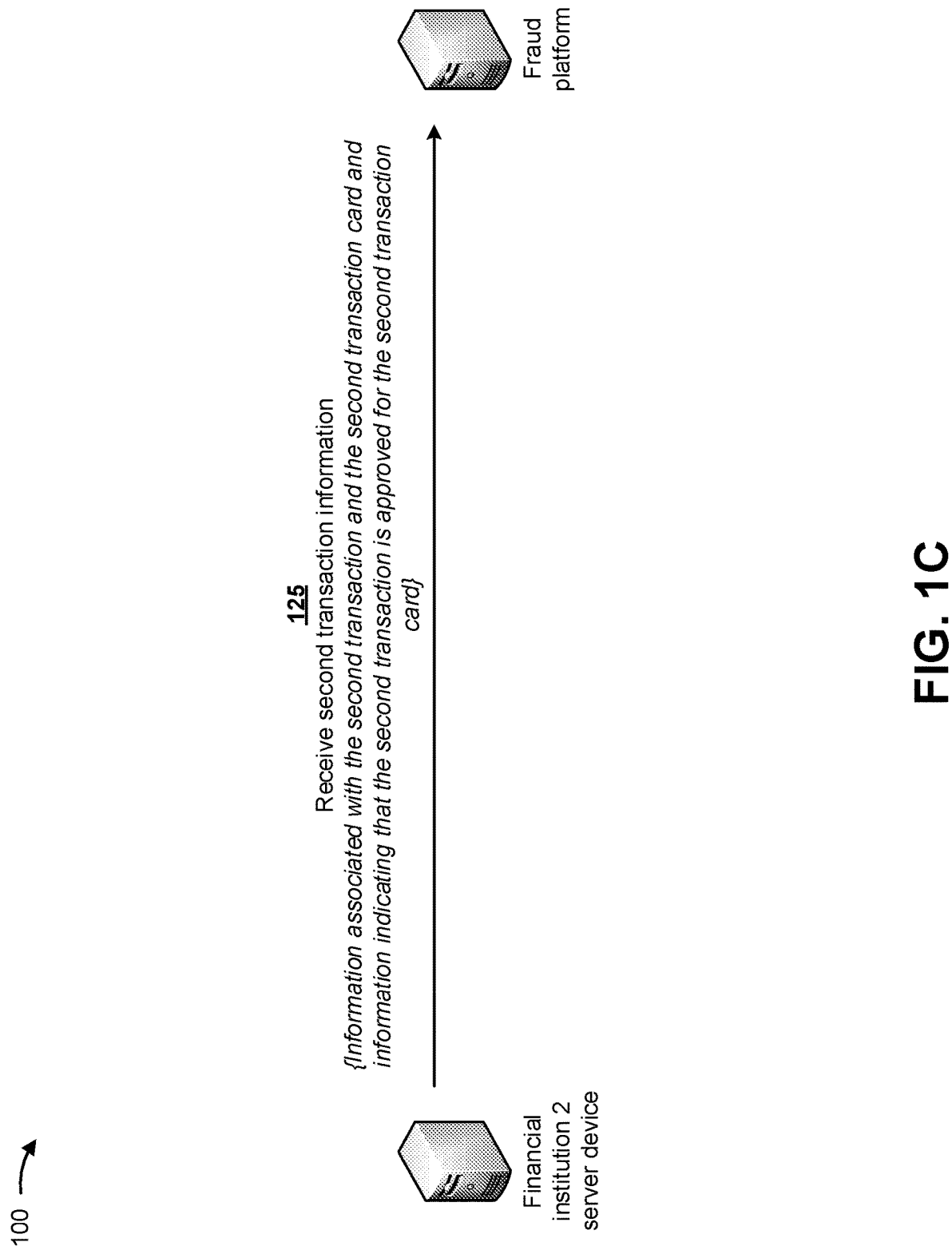

As shown in FIG. 1C, and by reference number 125, the fraud platform may receive, from the server device associated with the second financial institution, second transaction information based on the user device utilizing the second transaction card to conduct the second transaction. In some implementations, the second transaction information may include information associated with the second transaction, the second transaction card, the second financial institution associated with the second transaction card and/or the user, the user performing the second transaction, the merchant associated with the merchant server device, and/or the like. In some implementations, the fraud platform may receive the second transaction information in real time, near-real time, periodically, and/or the like. In some implementations, the fraud platform may receive the second transaction information from third party sources rather than directly from the server device associated with the second financial institution. In some implementations, the fraud platform may receive the second transaction information by scraping the second transaction information from the payment application executing on the user device.

Figure 1D:
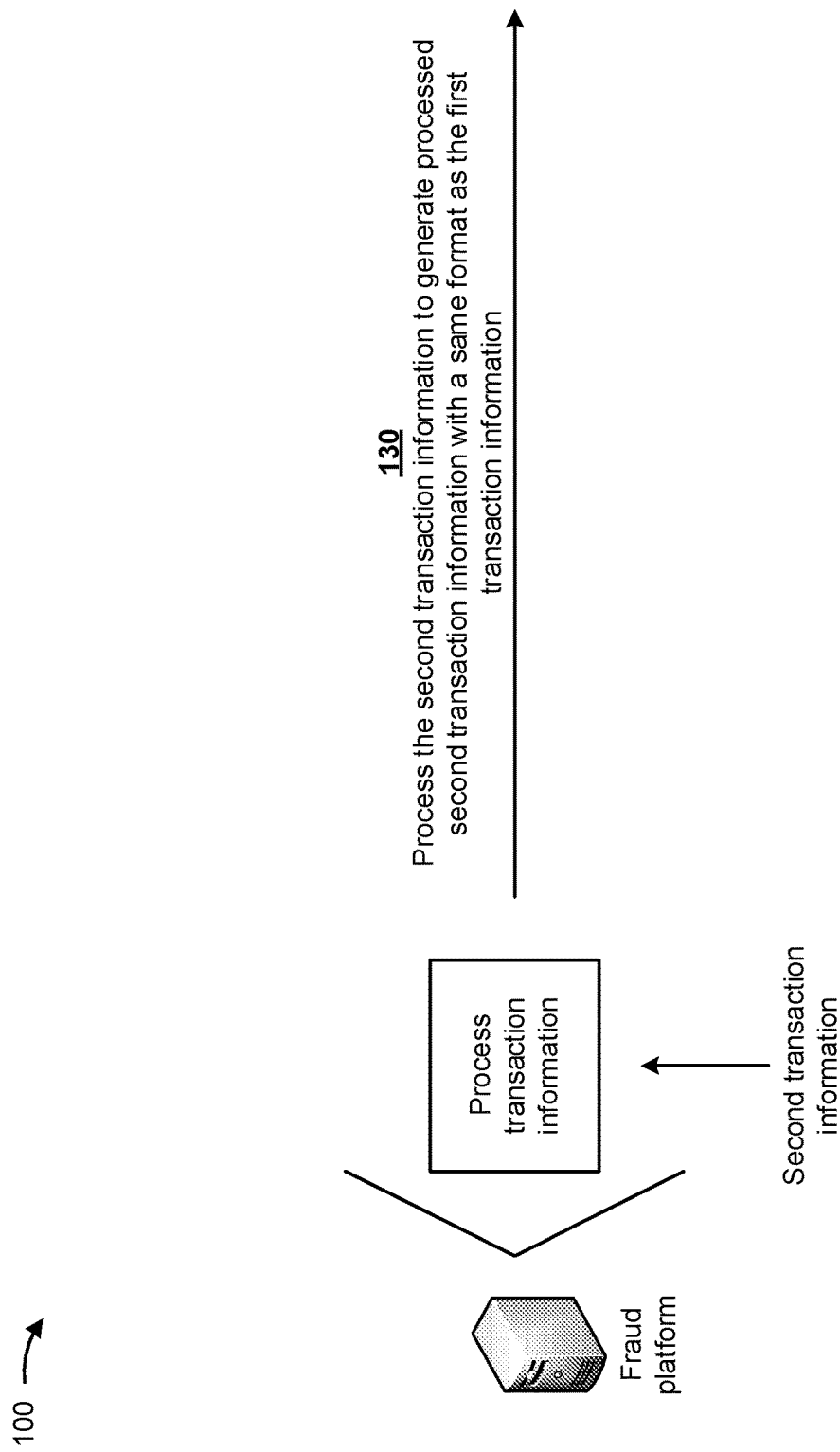

As shown in FIG. 1D, and by reference number 130, the fraud platform may process the second transaction information to generate processed second transaction information with a same format as the first transaction information. In some implementations, the fraud platform may use one or more processing techniques on the second transaction information to generate the processed second transaction information. For example, the fraud platform may utilize a natural language processing technique, a data cleansing method, and/or the like, to process the second transaction information and generate the processed second transaction information.

In some implementations, the fraud platform may apply natural language processing to interpret the second transaction information and generate additional information associated with the potential meaning of information within the second transaction information. Natural language processing involves techniques performed (e.g., by a computer system) to analyze, understand, and derive meaning from human language in a useful way. Rather than treating text like a mere sequence of symbols, natural language processing considers a hierarchical structure of language (e.g., several words can be treated as a phrase, several phrases can be treated as a sentence, and the words, phrases, and/or sentences convey ideas that can be interpreted). Natural language processing can be applied to analyze text, allowing machines to understand how humans speak, enabling real world applications such as automatic text summarization, sentiment analysis, topic extraction, named entity recognition, parts-of-speech tagging, relationship extraction, stemming, and/or the like.

In some implementations, the fraud platform may utilize a data cleansing method to process the second transaction information and to detect and/or correct corrupt or inaccurate data in the second transaction information. The data cleansing method may include detecting and correcting (or removing) corrupt or inaccurate data (e.g., records from a record set, table, or database), and then replacing, modifying, or deleting the corrupt or inaccurate data. The data cleansing method may detect and correct inconsistencies originally caused by user entry errors, by corruption in transmission or storage, or by utilization of different definitions for similar data in different data stores. The data cleansing method may include removing typographical errors or validating and correcting values against a known list of entities. In this case, validation may be strict (e.g., rejecting any address that does not have a valid postal code) or fuzzy (e.g., correcting records that partially match existing, known records). The data cleansing method may also include cleaning data by cross checking the data with a validated data set, standardizing the data by changing a reference data set to a new standard (e.g., use of standard codes), and/or the like. Additionally, the data cleansing method may include data enhancement, where data is made more complete by adding related information (e.g., appending an address with any phone number related to that address). The data cleansing method may also involve activities, such as harmonization of data (e.g., harmonization of short codes (e.g., St., Rd., and/or the like)) to actual words (e.g., street, road, and/or the like).

In this way, the fraud platform may process the second transaction information to generate the processed second transaction information.

Figure 1E:
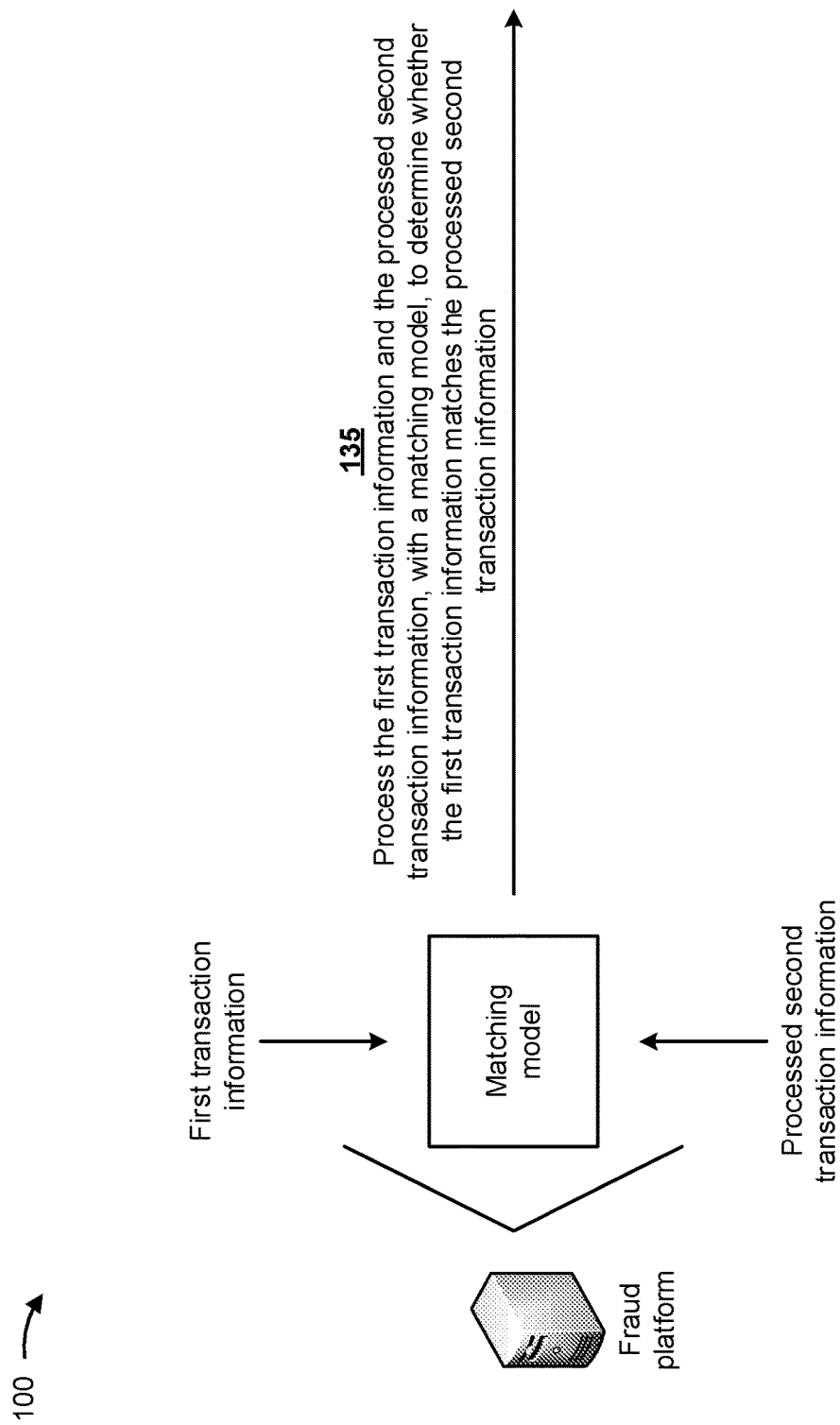

As shown in FIG. 1E, and by reference number 135, the fraud platform may process the first transaction information and the processed second transaction information, with a matching model, to determine whether the first transaction information matches the processed second transaction information. In some implementations, the matching model may determine whether the first transaction information matches the processed second transaction information based on comparing an amount associated with the first transaction and an amount associated with the second transaction, comparing information indicating a merchant associated with the first transaction and information indicating a merchant associated with the second transaction, comparing information indicating a location associated with the first transaction and information indicating a location associated with the second transaction, comparing information indicating whether the first transaction occurred online or at a physical location and information indicating whether the second transaction occurred online or at a physical location, comparing information indicating a time associated with the first transaction and information indicating a time associated with the second transaction, comparing information indicating a date associated with the first transaction and information indicating a date associated with the second transaction, and/or the like. In some implementations, the first transaction information may match and/or substantially match the processed second transaction information when one or more of the previously-mentioned parameters match for both the first transaction information and the processed second transaction information; when parameters associated with the first transaction information match parameters associated with the processed second transaction information within a predetermined threshold (e.g., when 60%, 70%, 80%, and/or the like of the first transaction information parameters match the processed second transaction information parameters); and/or the like.

In some implementations, the matching model may include a machine learning model (e.g., a pattern recognition model) that is trained and received by the fraud platform from another source. In some implementations, the fraud platform may perform a training operation on the matching model, with historical data. The historical data may include data identifying historical transactions associated with transaction cards, amounts associated with the historical transactions, merchants associated with the historical transactions, locations associated with the historical transactions, whether the historical transactions occurred online or at physical locations, which of the historical transactions are associated with the same transaction but different transaction cards, and/or the like.

The fraud platform may separate the historical data into a training set, a validation set, a test set, and/or the like. The training set may be utilized to train the matching model. The validation set may be utilized to validate results of the trained matching model. The test set may be utilized to test operations of the matching model. In some implementations, the fraud platform may train the matching model using, for example, an unsupervised training procedure and based on the historical data. For example, the fraud platform may perform dimensionality reduction to reduce the historical data to a minimum feature set, thereby reducing resources (e.g., processing resources, memory resources, and/or the like) to train the matching model and may apply a classification technique to the minimum feature set.

In some implementations, the fraud platform may use a logistic regression classification technique to determine a categorical outcome (e.g., historical transactions that are associated with the same transaction but different transaction cards). Additionally, or alternatively, the fraud platform may use a naïve Bayesian classifier technique. In this case, the fraud platform may perform binary recursive partitioning to split the historical data into partitions and/or branches and use the partitions and/or branches to perform predictions (e.g., identifying historical transactions that are associated with the same transaction but different transaction cards). Based on using recursive partitioning, the fraud platform may reduce utilization of computing resources relative to manual, linear sorting and analysis of data points, thereby enabling use of thousands, millions, or billions of data points to train the matching model, which may result in a more accurate model than using fewer data points.

Additionally, or alternatively, the fraud platform may use a support vector machine (SVM) classifier technique to generate a non-linear boundary between data points in the training set. In this case, the non-linear boundary is used to classify test data into a particular class or classes.

Additionally, or alternatively, the fraud platform may train the matching model using a supervised training procedure that includes receiving input to the matching model from a subject matter expert, which may reduce an amount of time, an amount of processing resources, and/or the like to train the matching model relative to an unsupervised training procedure. In some implementations, the fraud platform may use one or more other model training techniques, such as a neural network technique, a latent semantic indexing technique, and/or the like. For example, the fraud platform may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained matching model generated by the fraud platform by being more robust to noisy, imprecise, or incomplete data, and by enabling the fraud platform to detect patterns and/or trends undetectable to human analysts or systems using less complex techniques.

Figure 1F:
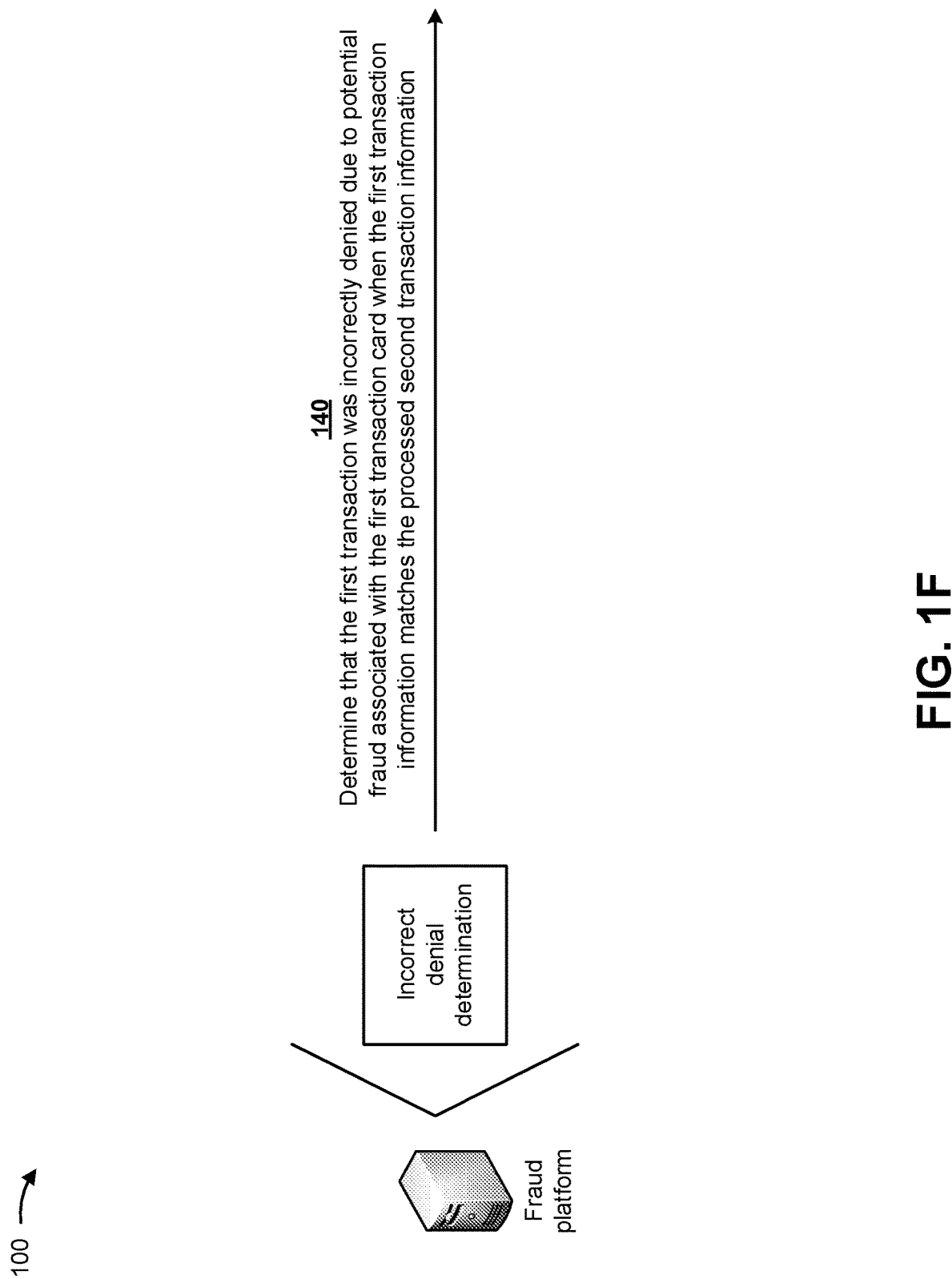

As shown in FIG. 1F, and by reference number 140, the fraud platform may determine that the first transaction was incorrectly denied due to potential fraud associated with the first transaction card when the first transaction information matches the processed second transaction information. In some implementations, when the matching model determines that the first transaction information matches the processed second transaction information, the fraud platform may determine that the first transaction was incorrectly denied due to potential fraud associated with the first transaction card since the second transaction was approved and matches the first transaction. In some implementations, when the matching model determines that the first transaction information fails to match the processed second transaction information, the fraud platform may determine that the first transaction was correctly denied due to potential fraud associated with the first transaction card.

Figure 1G:
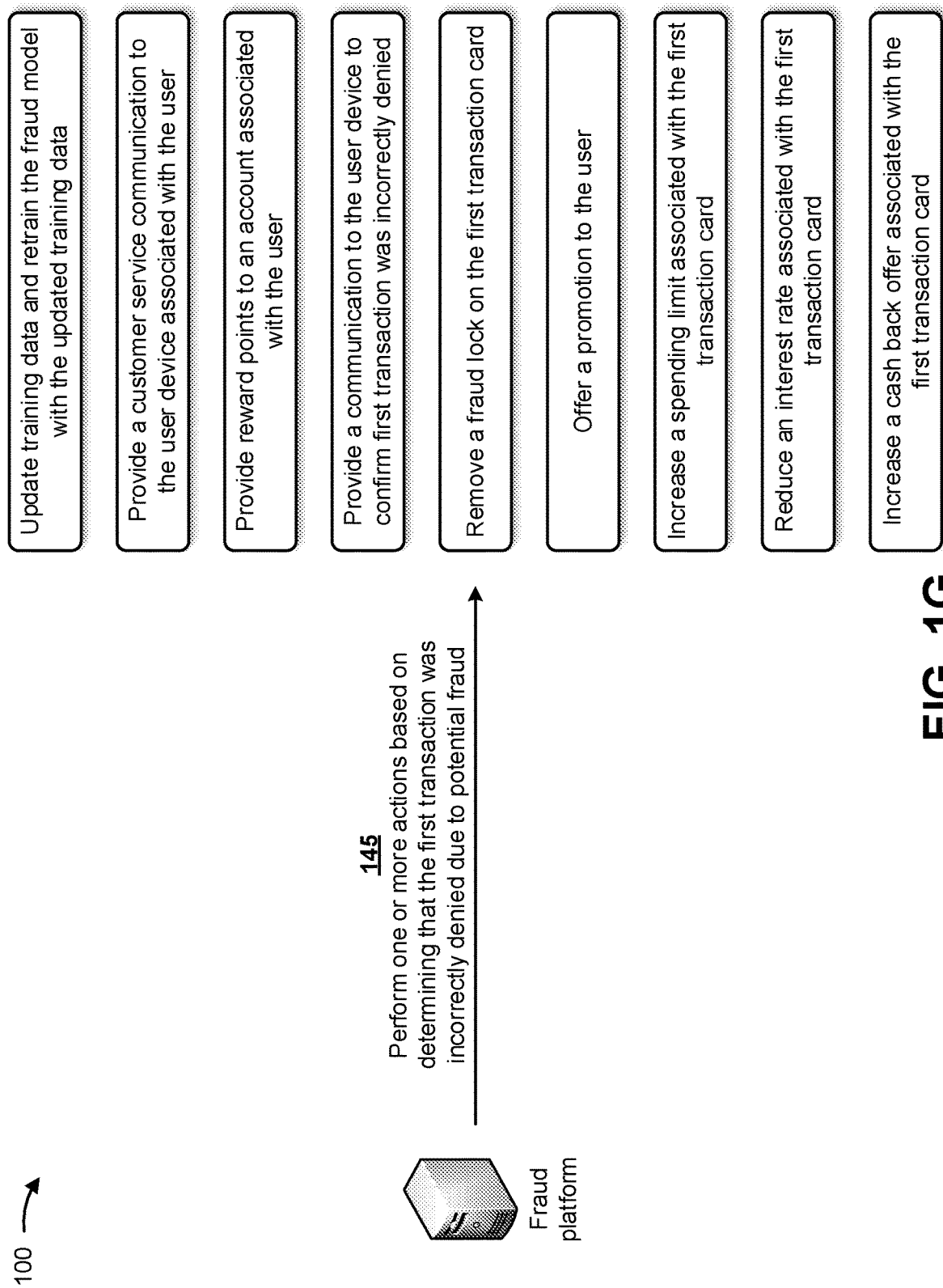

As shown in FIG. 1G, and by reference number 145, the fraud platform may automatically perform one or more actions based on determining that the first transaction was incorrectly denied due to potential fraud. In some implementations, the one or more actions may include the fraud platform updating training data for the fraud model and retraining the fraud model with the updated training data. In this way, the fraud model is updated so that users are less likely to be inconvenienced in the future with incorrect transaction denials, which conserves resources that would otherwise be wasted in processing additional and unnecessary transactions due to such incorrect transaction denials.

In some implementations, the one or more actions may include the fraud platform providing a customer service communication (e.g., a call, a text, an email, and/or the like) to the user device associated with the user. For example, the customer service communication may indicate that the transaction was incorrectly denied and may apologize to the user for the inconvenience. In this way, the fraud platform minimizes damaged customer relations with the user caused by the incorrect denial of the transaction.

In some implementations, the one or more actions may include the fraud platform providing reward points, a gift, and/or the like to an account associated with the user. In this way, the fraud platform quickly recognizes the incorrectly denied transaction and promptly compensates the user for the inconvenience, which may prevent losing the user due to the denied transaction and improves customer service.

In some implementations, the one or more actions may include the fraud platform providing a communication (e.g., a call, a text, an email, and/or the like) to the user device associated with the user, to confirm that the first transaction was incorrectly denied. In this way, the fraud platform minimizes damaged customer relations with the user caused by the incorrect denial of the transaction and conserves resources that would otherwise be wasted by the user attempting to contact the first financial institution about the incorrectly denied transaction.

In some implementations, the one or more actions may include the fraud platform removing a fraud lock on the first transaction card. In this way, the user is able to promptly utilize the first transaction card for future transactions, which conserves resources that would otherwise be wasted by the user attempting to contact the first financial institution about the fraud lock.

In some implementations, the one or more actions may include the fraud platform offering a promotion (e.g., a free checking account) to the user. In this way, the fraud platform quickly recognizes the incorrectly denied transaction and promptly compensates the user for the inconvenience, which prevents losing the user due to the denied transaction and improves customer service.

In some implementations, the one or more actions may include the fraud platform increasing a spending limit associated with the first transaction card. In this way, the fraud platform promptly compensates the user for the inconvenience, which prevents losing the user due to the denied transaction and improves customer service.

In some implementations, the one or more actions may include the fraud platform reducing an interest rate associated with the first transaction card. In this way, the fraud platform promptly compensates the user for the inconvenience, which prevents losing the user due to the denied transaction and improves customer service.

In some implementations, the one or more actions may include the fraud platform increasing a cash back offer associated with the first transaction card. In this way, the fraud platform promptly compensates the user for the inconvenience, which prevents losing the user due to the denied transaction and improves customer service.

In this way, several different stages of the process for updating a machine learning fraud model and taking actions to remedy erroneous denials may be automated based on third party transaction information, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that updates a machine learning fraud model based on third party transaction information. Finally, automating the process for updating a machine learning fraud model based on third party transaction information conserves computing resources (e.g., processing resources, memory resources, and/or the like) that would otherwise be wasted in attempting to rectify transactions that were incorrectly denied by the machine learning fraud model.

As indicated above, FIGS. 1A-1G are provided merely as examples. Other examples may differ from what is described with regard to FIGS. 1A-1G.

Figure 2:
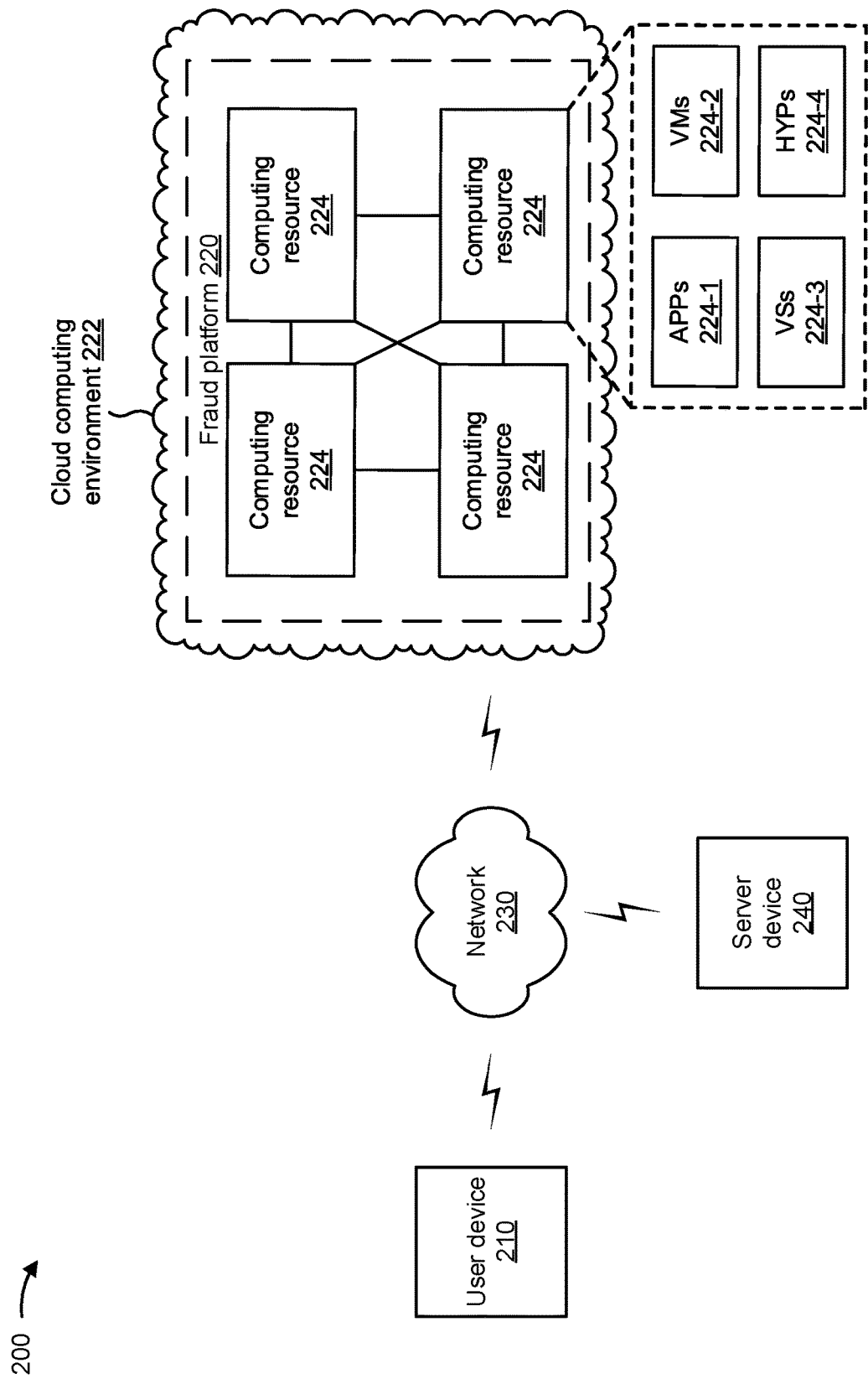
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a fraud platform 220, a network 230, and a server device 240. Devices of environment 200 may interconnect via wired connections, wireless connections, or a combination of wired and wireless connections.

User device 210 includes one or more devices capable of receiving, generating, storing, processing, and/or providing information, such as transaction information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to fraud platform 220 and/or server device 240.

Fraud platform 220 includes one or more devices that update a machine learning fraud model based on third party transaction information. In some implementations, fraud platform 220 may be designed to be modular such that certain software components may be swapped in or out depending on a particular need. As such, fraud platform 220 may be easily and/or quickly reconfigured for different uses. In some implementations, fraud platform 220 may receive information from and/or transmit information to one or more user devices 210 and/or server devices 240.

In some implementations, as shown, fraud platform 220 may be hosted in a cloud computing environment 222. Notably, while implementations described herein describe fraud platform 220 as being hosted in cloud computing environment 222, in some implementations, fraud platform 220 may be non-cloud-based (i.e., may be implemented outside of a cloud computing environment) or may be partially cloud-based.

Cloud computing environment 222 includes an environment that hosts fraud platform 220. Cloud computing environment 222 may provide computation, software, data access, storage, etc. services that do not require end-user knowledge of a physical location and configuration of system(s) and/or device(s) that host fraud platform 220. As shown, cloud computing environment 222 may include a group of computing resources 224 (referred to collectively as "computing resources 224" and individually as "computing resource 224").

Computing resource 224 includes one or more personal computers, workstation computers, server devices, and/or other types of computation and/or communication devices. In some implementations, computing resource 224 may host fraud platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with fraud platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of user device 210 and/or server device 240 or an operator of fraud platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a server device, a group of server devices, or a similar type of device, associated with a merchant, a financial institution, and/or the like. In some implementations, server device 240 may receive information from and/or transmit information to user device 210 and/or fraud platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
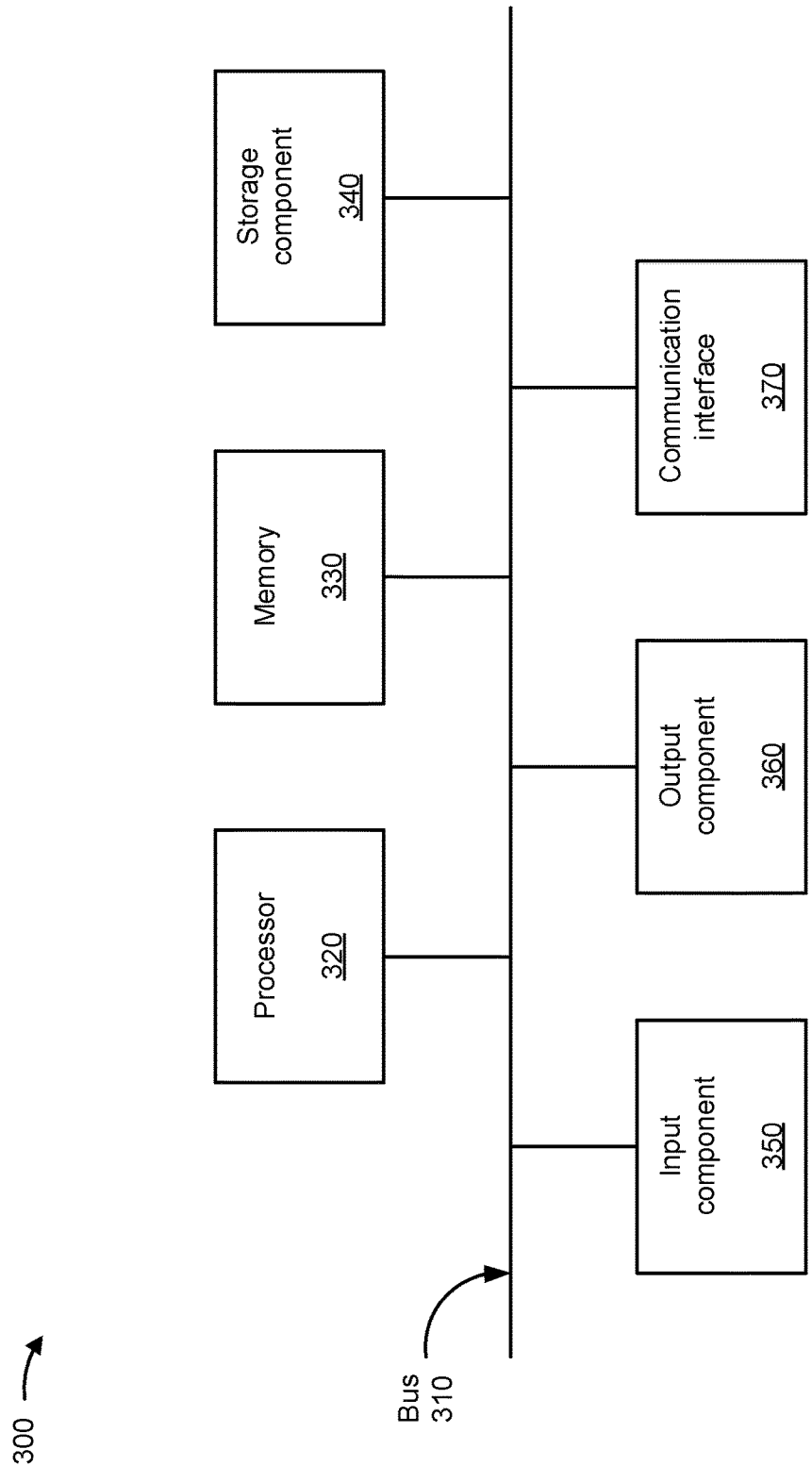
FIG. 3 is a diagram of example components of one or more devices of FIG. 2.

FIG. 3 is a diagram of example components of a device 300. Device 300 may correspond to user device 210, fraud platform 220, computing resource 224, and/or server device 240. In some implementations, user device 210, fraud platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among the components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
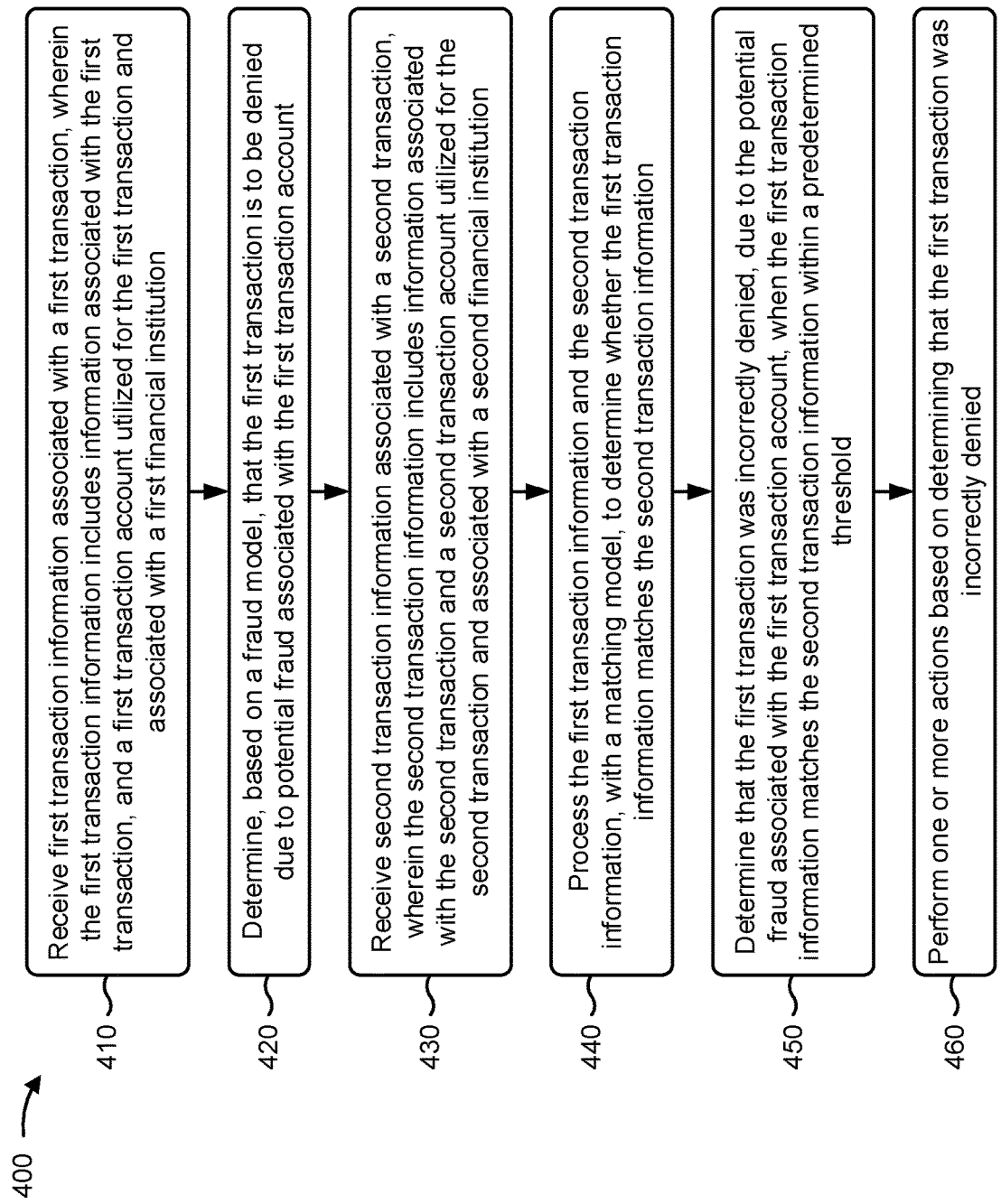

FIG. 4 is a flow chart of an example process 400 for updating a machine learning fraud model based on third party transaction information. In some implementations, one or more process blocks of FIG. 4 may be performed by a fraud platform (e.g., fraud platform 220). In some implementations, one or more process blocks of FIG. 4 may be performed by another device or a group of devices separate from or including the fraud platform, such as a user device (e.g., user device 210) and/or a server device (e.g., server device 240).

As shown in FIG. 4, process 400 may include receiving first transaction information associated with a first transaction, wherein the first transaction information includes information associated with the first transaction, and a first transaction card utilized for the first transaction and associated with a first financial institution (block 410). For example, the fraud platform (e.g., using computing resource 224, processor 320, communication interface 370, and/or the like) may receive first transaction information associated with a first transaction, as described above in connection with FIGS. 1A-2. In some implementations, the first transaction information may include information associated with the first transaction, and a first transaction card utilized for the first transaction and associated with a first financial institution.

As further shown in FIG. 4, process 400 may include determining, based on a fraud model, that the first transaction is to be denied due to potential fraud associated with the first transaction card (block 420). For example, the fraud platform (e.g., using computing resource 224, processor 320, memory 330, and/or the like) may determine, based on a fraud model, that the first transaction is to be denied due to potential fraud associated with the first transaction card, as described above in connection with FIGS. 1A-2.

As further shown in FIG. 4, process 400 may include receiving second transaction information associated with a second transaction, wherein the second transaction information includes information associated with the second transaction and a second transaction card utilized for the second transaction and associated with a second financial institution (block 430). For example, the fraud platform (e.g., using computing resource 224, processor 320, communication interface 370, and/or the like) may receive second transaction information associated with a second transaction, as described above in connection with FIGS. 1A-2. In some implementations, the second transaction information may include information associated with the second transaction, and information associated with a second transaction card utilized for the second transaction and associated with a second financial institution.

As further shown in FIG. 4, process 400 may include processing the first transaction information and the second transaction information, with a matching model, to determine whether the first transaction information matches the second transaction information (block 440). For example, the fraud platform (e.g., using computing resource 224, processor 320, memory 330, and/or the like) may process the first transaction information and the second transaction information, with a matching model, to determine whether the first transaction information matches the second transaction information, as described above in connection with FIGS. 1A-2.

As further shown in FIG. 4, process 400 may include determining that the first transaction was incorrectly denied, due to the potential fraud associated with the first transaction card, when the first transaction information matches the second transaction information within a predetermined threshold (block 450). For example, the fraud platform (e.g., using computing resource 224, processor 320, storage component 340, and/or the like) may determine that the first transaction was incorrectly denied, due to the potential fraud associated with the first transaction card, when the first transaction information matches the second transaction information within a predetermined threshold, as described above in connection with FIGS. 1A-2.

As further shown in FIG. 4, process 400 may include performing one or more actions based on determining that the first transaction was incorrectly denied (block 460). For example, the fraud platform (e.g., using computing resource 224, processor 320, memory 330, communication interface 370, and/or the like) may perform one or more actions based on determining that the first transaction was incorrectly denied, as described above in connection with FIGS. 1A-2.

Process 400 may include additional implementations, such as any single implementation or any combination of implementations described below and/or described with regard to any other process described herein.

In some implementations, the fraud platform may process the second transaction information to generate processed second transaction information with a same format as the first transaction information. In some implementations, when performing the one or more actions, the fraud platform may update training data for the fraud model, based on parameters of the fraud model that caused the first transaction to be incorrectly denied, to generate updated training data, and may retrain the fraud model with the updated training data.

In some implementations, when performing the one or more actions, the fraud platform may provide a customer service communication to a user device associated with a user of the first transaction card and the second transaction card, may provide reward points to an account associated with the user, may provide, to the user device, a communication requesting confirmation that the first transaction was incorrectly denied, and/or may remove a fraud lock on the first transaction card.

In some implementations, when performing the one or more actions, the fraud platform may provide a promotion to a user device associated with a user of the first transaction card and the second transaction card, may increase a spending limit associated with the first transaction card, may reduce an interest rate associated with the first transaction card, and/or may increase a cash back offer associated with the first transaction card.

In some implementations, when processing the first transaction information and the second transaction information with the matching model, the fraud platform may compare a first amount associated with the first transaction and a second amount associated with the second transaction, may compare first merchant information associated with the first transaction and second merchant information associated with the second transaction, may compare first location information associated with the first transaction and second location information associated with the second transaction, may compare first source information indicating whether the first transaction occurred online or at a first physical location and second source information indicating whether the second transaction occurred online or at a second physical location, may compare first time information associated with the first transaction and second time information associated with the second transaction, may compare first date information associated with the first transaction and second date information associated with the second transaction, and/or the like.

In some implementations, when receiving the second transaction information associated with the second transaction, the fraud platform may receive the second transaction information from the second financial institution, from a third party, or via scraping.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for updating a machine learning fraud model based on third party transaction information. In some implementations, one or more process blocks of FIG. 5 may be performed by a fraud platform (e.g., fraud platform 220). In some implementations, one or more process blocks of FIG. 5 may be performed by another device or a group of devices separate from or including the fraud platform, such as a user device (e.g., user device 210) and/or a server device (e.g., server device 240).

As shown in FIG. 5, process 500 may include receiving first transaction information associated with a first transaction, wherein the first transaction information includes information associated with the first transaction, and a first transaction card utilized for the first transaction and associated with a first financial institution (block 510). For example, the fraud platform (e.g., using computing resource 224, processor 320, communication interface 370, and/or the like) may receive first transaction information associated with a first transaction, as described above in connection with FIGS. 1A-2. In some implementations, the first transaction information may include information associated with the first transaction, and information associated with a first transaction card utilized for the first transaction and associated with a first financial institution.

As further shown in FIG. 5, process 500 may include denying, based on a fraud model, the first transaction, due to potential fraud associated with the first transaction card (block 520). For example, the fraud platform (e.g., using computing resource 224, processor 320, memory 330, and/or the like) may deny, based on a fraud model, the first transaction due to potential fraud associated with the first transaction card, as described above in connection with FIGS. 1A-2.

As further shown in FIG. 5, process 500 may include receiving second transaction information associated with a second transaction, wherein the second transaction information includes information associated with the second transaction, and a second transaction card utilized for the second transaction and associated with a second financial institution (block 530). For example, the fraud platform (e.g., using computing resource 224, processor 320, communication interface 370, and/or the like) may receive second transaction information associated with a second transaction, as described above in connection with FIGS. 1A-2. In some implementations, the second transaction information may include information associated with the second transaction, and information associated with a second transaction card utilized for the second transaction and associated with a second financial institution.

As further shown in FIG. 5, process 500 may include processing the second transaction information to generate processed second transaction information with substantially a same format as the first transaction information (block 540). For example, the fraud platform (e.g., using computing resource 224, processor 320, storage component 340, and/or the like) may process the second transaction information to generate processed second transaction information with substantially a same format as the first transaction information, as described above in connection with FIGS. 1A-2.

As further shown in FIG. 5, process 500 may include processing the first transaction information and the processed second transaction information, with a matching model, to determine whether the first transaction information matches the processed second transaction information (block 550). For example, the fraud platform (e.g., using computing resource 224, processor 320, memory 330, and/or the like) may process the first transaction information and the processed second transaction information, with a matching model, to determine whether the first transaction information matches the processed second transaction information, as described above in connection with FIGS. 1A-2.

As further shown in FIG. 5, process 500 may include determining that the first transaction was incorrectly denied, due to the potential fraud associated with the first transaction card, when the first transaction information matches the processed second transaction information within a predetermined threshold (block 560). For example, the fraud platform (e.g., using computing resource 224, processor 320, storage component 340, and/or the like) may determine that the first transaction was incorrectly denied, due to the potential fraud associated with the first transaction card, when the first transaction information matches the processed second transaction information within a predetermined threshold, as described above in connection with FIGS. 1A-2.

As further shown in FIG. 5, process 500 may include performing one or more actions based on determining that the first transaction was incorrectly denied (block 570). For example, the fraud platform (e.g., using computing resource 224, processor 320, memory 330, communication interface 370, and/or the like) may perform one or more actions based on determining that the first transaction was incorrectly denied, as described above in connection with FIGS. 1A-2.

Process 500 may include additional implementations, such as any single implementation or any combination of implementations described below and/or described with regard to any other process described herein.

In some implementations, the matching model may include a fuzzy matching-based machine learning model. In some implementations, when performing the one or more actions, the fraud platform may update training data for the fraud model, based on parameters of the fraud model that caused the first transaction to be incorrectly denied, to generate updated training data, and may retrain the fraud model with the updated training data.

In some implementations, when performing the one or more actions, the fraud platform may provide a customer service communication to a user device associated with a user of the first transaction card and the second transaction card, may provide reward points to an account associated with the user; may provide, to the user device, a communication requesting confirmation that the first transaction was incorrectly denied; may remove a fraud lock on the first transaction card, may provide a promotion to the user device; may increase a spending limit associated with the first transaction card; may reduce an interest rate associated with the first transaction card; and/or may increase a cash back offer associated with the first transaction card.

In some implementations, when processing the second transaction information to generate the processed second transaction information, the fraud platform may process the second transaction information with a data cleansing technique to generate cleansed second transaction information, and may correlate the cleansed second transaction information with the first transaction information to generate the processed second transaction information with substantially the same format as the first transaction information.

In some implementations, when processing the first transaction information and the processed second transaction information with the matching model, the fraud platform may compare a first amount associated with the first transaction and a second amount associated with the second transaction, may compare first merchant information associated with the first transaction and second merchant information associated with the second transaction, may compare first location information associated with the first transaction and second location information associated with the second transaction, may compare first source information indicating whether the first transaction occurred online or at a first physical location and second source information indicating whether the second transaction occurred online or at a second physical location, may compare first time information associated with the first transaction and second time information associated with the second transaction, may compare first date information associated with the first transaction and second date information associated with the second transaction, and/or the like.

In some implementations, when receiving the first transaction information associated with the first transaction, the fraud platform may receive the first transaction information from the first financial institution or a merchant associated with the first transaction.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for updating a machine learning fraud model based on third party transaction information. In some implementations, one or more process blocks of FIG. 6 may be performed by a fraud platform (e.g., fraud platform 220). In some implementations, one or more process blocks of FIG. 6 may be performed by another device or a group of devices separate from or including the fraud platform, such as a user device (e.g., user device 210) and/or a server device (e.g., server device 240).

As shown in FIG. 6, process 600 may include receiving first transaction information associated with a first transaction, wherein the first transaction information includes information associated with the first transaction, and a first transaction account utilized for the first transaction and associated with a first financial institution, and wherein the first transaction information includes information indicating that the first transaction was denied due to potential fraud associated with the first transaction account (block 610). For example, the fraud platform (e.g., using computing resource 224, processor 320, communication interface 370, and/or the like) may receive first transaction information associated with a first transaction, as described above in connection with FIGS. 1A-2. In some implementations, the first transaction information may include information associated with the first transaction, and with a first transaction account utilized for the first transaction and associated with a first financial institution. In some implementations, the first transaction information may include information indicating that the first transaction was denied due to potential fraud associated with the first transaction account.

As further shown in FIG. 6, process 600 may include receiving second transaction information associated with a second transaction, wherein the second transaction information includes information associated with the second transaction, and a second transaction account utilized for the second transaction and associated with a second financial institution, and wherein the second transaction information includes information indicating that the second transaction was approved (block 620). For example, the fraud platform (e.g., using computing resource 224, processor 320, storage component 340, communication interface 370, and/or the like) may receive second transaction information associated with a second transaction, as described above in connection with FIGS. 1A-2. In some implementations, the second transaction information may include information associated with the second transaction, and with a second transaction account utilized for the second transaction and associated with a second financial institution. In some implementations, the second transaction information may include information indicating that the second transaction was approved.

As further shown in FIG. 6, process 600 may include processing the first transaction information and the second transaction information, with a matching model, to determine whether the first transaction information matches the second transaction information (block 630). For example, the fraud platform (e.g., using computing resource 224, processor 320, memory 330, and/or the like) may process the first transaction information and the second transaction information, with a matching model, to determine whether the first transaction information matches the second transaction information, as described above in connection with FIGS. 1A-2.

As further shown in FIG. 6, process 600 may include determining that the first transaction was incorrectly denied, due to the potential fraud associated with the first transaction account, when the first transaction information substantially matches the second transaction information (block 640). For example, the fraud platform (e.g., using computing resource 224, processor 320, storage component 340, and/or the like) may determine that the first transaction was incorrectly denied, due to the potential fraud associated with the first transaction account, when the first transaction information substantially matches the second transaction information, as described above in connection with FIGS. 1A-2.

As further shown in FIG. 6, process 600 may include updating training data for a fraud model, based on parameters of the fraud model that caused the first transaction to be incorrectly denied, to generate updated training data (block 650). For example, the fraud platform (e.g., using computing resource 224, processor 320, memory 330, and/or the like) may update training data for a fraud model, based on parameters of the fraud model that caused the first transaction to be incorrectly denied, to generate updated training data, as described above in connection with FIGS. 1A-2.

As further shown in FIG. 6, process 600 may include retraining the fraud model with the updated training data (block 660). For example, the fraud platform (e.g., using computing resource 224, processor 320, storage component 340, and/or the like) may retrain the fraud model with the updated training data, as described above in connection with FIGS. 1A-2.

Process 600 may include additional implementations, such as any single implementation or any combination of implementations described below and/or described with regard to any other process described herein.

In some implementations, the fraud platform may process the second transaction information to generate processed second transaction information with a same format as the first transaction information. In some implementations, the fraud platform may perform one or more actions based on determining that the first transaction was incorrectly denied.

In some implementations, when performing the one or more actions, the fraud platform may provide a customer service communication to a user device associated with a user of the first transaction account and the second transaction account, may provide reward points to the first transaction account, may provide, to the user device, a communication requesting confirmation that the first transaction was incorrectly denied, and/or may remove a fraud lock on the first transaction account.

In some implementations, when performing the one or more actions, the fraud platform may provide a promotion to a user device associated with a user of the first transaction account and the second transaction account, may increase a spending limit associated with the first transaction account, may reduce an interest rate associated with the first transaction account, and/or may increase a cash back offer associated with the first transaction account.

In some implementations, when processing the first transaction information and the second transaction information with a matching model, the fraud platform may compare a first amount associated with the first transaction and a second amount associated with the second transaction, may compare first merchant information associated with the first transaction and second merchant information associated with the second transaction, may compare first location information associated with the first transaction and second location information associated with the second transaction, may compare first source information indicating whether the first transaction occurred online or at a first physical location and second source information indicating whether the second transaction occurred online or at a second physical location, may compare first time information associated with the first transaction and second time information associated with the second transaction, may compare first date information associated with the first transaction and second date information associated with the second transaction, and/or the like.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device, first transaction information associated with a first transaction, associated with a first financial institution, based on a first transaction account being utilized to conduct the first transaction;
determining, by the device and based on a fraud model, that the first transaction is to be denied due to a potential fraud associated with the first transaction account;
receiving, by the device, second transaction information associated with a second transaction, associated with a second financial institution, based on a user device or a second transaction account being utilized to conduct the second transaction;
processing, by the device, the first transaction information and the second transaction information, with a matching model that is based on a machine learning model, to determine whether the first transaction information matches the second transaction information;

determining, by the device, that the first transaction was incorrectly denied, due to potential fraud associated with the first transaction account, when the first transaction information matches the second transaction information within a predetermined threshold;

removing, by the device and based on determining that the first transaction was incorrectly denied, a lock on the first transaction account to allow the first transaction account to be utilized;

updating, by the device and based on parameters of the fraud model that caused the first transaction to be incorrectly denied, training data for the fraud model, to generate updated training data; and retraining, by the device, the fraud model with the updated training data.

2. The method of claim 1, further comprising:
performing one or more actions based on determining that the first transaction was incorrectly denied.

3. The method of claim 2, wherein performing the one or more actions comprises:
providing a promotion to another device associated with a user of the first transaction account and the second transaction account;
increasing a spending limit associated with the first transaction account;
reducing an interest rate associated with the first transaction account;
increasing a cash back offer associated with the first transaction account;
providing a customer service communication to the other device;
providing reward points to the first transaction account; or
providing, to the other device, a communication requesting confirmation that the first transaction was incorrectly denied.

4. The method of claim 1, wherein the matching model is a pattern recognition model that is trained and received from another device.

5. The method of claim 1, wherein the matching model is trained with historical data,
wherein the historical data includes one or more of:
data identifying historical transactions associated with transaction accounts,
data identifying amounts associated with the historical transactions,
data identifying merchants associated with the historical transactions,
data identifying locations associated with the historical transactions,
data identifying whether the historical transactions occurred online or at physical locations, or
data identifying which of the historical transactions are associated with a same transaction but different transaction accounts.

6. The method of claim 1, further comprising:
processing the second transaction information with a data cleansing technique to generate cleansed second transaction information; and
correlating the cleansed second transaction information with the first transaction information to generate the processed second transaction information with substantially the same format as the first transaction information.

7. The method of claim 1, wherein processing the first transaction information and the second transaction information with the matching model comprises one or more of:

comparing a first amount associated with the first transaction and a second amount associated with the second transaction;
comparing first merchant information associated with the first transaction and second merchant information associated with the second transaction;
comparing first location information associated with the first transaction and second location information associated with the second transaction;
comparing first source information indicating whether the first transaction occurred online or at a first physical location and second source information indicating whether the second transaction occurred online or at a second physical location;
comparing first time information associated with the first transaction and second time information associated with the second transaction; or
comparing first date information associated with the first transaction and second date information associated with the second transaction.

8. A device, comprising:
one or more memories; and
one or more processors communicatively coupled to the one or more memories, configured to:
receive first transaction information associated with a first transaction based on a first transaction account being utilized to conduct the first transaction associated with a first financial institution;
deny, based on a fraud model, the first transaction due to a potential fraud associated with the first transaction account;
receive second transaction information associated with a second transaction based on a user device or a second transaction account being utilized to conduct the second transaction associated with a second financial institution;
process the first transaction information and the second transaction information, with a matching model that is based on a machine learning model, to determine whether the first transaction information matches the second transaction information;
determine that the first transaction was incorrectly denied, due to potential fraud associated with the first transaction account, when the first transaction information matches the second transaction information within a predetermined threshold;
remove, based on determining that the first transaction was incorrectly denied, a lock on the first transaction account to allow the first transaction account to be utilized;
update, based on parameters of the fraud model that caused the first transaction to be incorrectly denied, training data for the fraud model, to generate updated training data; and
retrain the fraud model with the updated training data.

9. The device of claim 8, wherein the one or more processors are further configured to perform at least one of:
providing a customer service communication to another device associated with a user of the first transaction account and the second transaction account, or
providing reward points to the first transaction account.

10. The device of claim 8, wherein the one or more processors are further configured to:
provide a promotion to another device associated with a user of the first transaction account and the second transaction account;

increase a spending limit associated with the first transaction account;
reduce an interest rate associated with the first transaction account; or
increase a cash back offer associated with the first transaction account.

11. The device of claim 8, wherein the matching model is trained with historical data,
wherein the historical data includes one or more of:
data identifying historical transactions associated with transaction accounts,
data identifying amounts associated with the historical transactions,
data identifying merchants associated with the historical transactions,
data identifying locations associated with the historical transactions,
data identifying whether the historical transactions occurred online or at physical locations, or
data identifying which of the historical transactions are associated with a same transaction but different transaction accounts.

12. The device of claim 8, wherein the one or more processors are further configured to:
process the second transaction information with a data cleansing technique to generate cleansed second transaction information; and
correlate the cleansed second transaction information with the first transaction information to generate the processed second transaction information with substantially the same format as the first transaction information.

13. The device of claim 8, wherein the one or more processors, when processing the first transaction information and the second transaction information with the matching model, are configured to one or more of:
compare a first amount associated with the first transaction and a second amount associated with the second transaction;
compare first merchant information associated with the first transaction and second merchant information associated with the second transaction;
compare first location information associated with the first transaction and second location information associated with the second transaction;
compare first source information indicating whether the first transaction occurred online or at a first physical location and second source information indicating whether the second transaction occurred online or at a second physical location;
compare first time information associated with the first transaction and second time information associated with the second transaction; or
compare first date information associated with the first transaction and second date information associated with the second transaction.

14. A non-transitory computer-readable medium storing instructions, the instructions comprising:
one or more instructions that, when executed by one or more processors, cause the one or more processors to:
receive first transaction information associated with a first transaction based on a first transaction account being utilized to conduct the first transaction associated with a first financial institution;
determine, based on a fraud model, that the first transaction is to be denied due to a potential fraud associated with the first transaction account;
receive second transaction information associated with a second transaction based on a user device or a second transaction account being utilized to conduct the second transaction associated with a second financial institution;
process the first transaction information and the second transaction information, with a matching model that is based on a machine learning model, to determine whether the first transaction information matches the second transaction information;
determine that the first transaction was incorrectly denied, due to potential fraud associated with the first transaction account, when the first transaction information matches the second transaction information within a predetermined threshold;
remove, based on determining that the first transaction was incorrectly denied, a lock on the first transaction account to allow the first transaction account to be utilized;
update, based on parameters of the fraud model that caused the first transaction to be incorrectly denied, training data for the fraud model, to generate updated training data; and
retrain the fraud model with the updated training data.

15. The non-transitory computer-readable medium of claim 14, wherein the one or more instructions, when executed by the one or more processors, further cause the one or more processors to:
update training data for the fraud model, based on parameters of the fraud model that caused the first transaction to be incorrectly denied, to generate updated training data; and
retrain the fraud model with the updated training data.

16. The non-transitory computer-readable medium of claim 14, wherein the one or more instructions, when executed by the one or more processors, further cause the one or more processors to:
perform one or more additional actions based on determining that the first transaction was incorrectly denied,
wherein the one or more additional actions include to:
increase a spending limit associated with the first transaction account;
reduce an interest rate associated with the first transaction account;
increase a cash back offer associated with the first transaction account;
provide a customer service communication to another device associated with a user of the first transaction account and the second transaction account;
provide reward points to the first transaction account; or
provide, to the other device, a communication requesting confirmation that the first transaction was incorrectly denied.

17. The non-transitory computer-readable medium of claim 14, wherein the matching model includes a fuzzy matching-based machine learning model.

18. The non-transitory computer-readable medium of claim 14, wherein the matching model is trained with historical data,
wherein the historical data includes one or more of:
data identifying historical transactions associated with transaction accounts,
data identifying amounts associated with the historical transactions, data identifying merchants associated with the historical transactions, data identifying locations associated with the historical transactions, data identifying whether the historical transactions occurred online or at physical locations, or data identifying which of the historical transactions are associated with a same transaction but different transaction accounts.

19. The non-transitory computer-readable medium of claim 14, wherein the one or more instructions, when executed by the one or more processors, further cause the one or more processors to:

process the second transaction information with a data cleansing technique to generate cleansed second transaction information; and correlate the cleansed second transaction information with the first transaction information to generate the processed second transaction information with substantially the same format as the first transaction information.

20. The non-transitory computer-readable medium of claim 14, wherein the one or more instructions, when executed by the one or more processors, further cause the one or more processors to:

provide a promotion to another device associated with a user of the first transaction account and the second transaction account based on determining that the first transaction was incorrectly denied.

\* \* \* \* \*